May 18, 1943 — P. MATHER — 2,319,620
PROCESS FOR CATALYTIC CONVERSION REACTIONS
Filed Feb. 26, 1940 — 3 Sheets-Sheet 1

INVENTOR
PERCY MATHER
BY Lee J. Gary
ATTORNEY

Patented May 18, 1943

2,319,620

UNITED STATES PATENT OFFICE 2,319,620

PROCESS FOR CATALYTIC CONVERSION REACTIONS

Percy Mather, Chicago, Ill., assignor to Universal Oil Products Company, Chicago, Ill., a corporation of Delaware Application February 26, 1940, Serial No. 320,815

4 Claims. (Cl. 196—52)

The invention relates to an improved method for conducting catalytically promoted conversion reactions and particularly those of the type devoted to the conversion of hydrocarbons, such as catalytic cracking, dehydrogenation, isomerization, cyclization, reforming, etc., wherein heavy carbonaceous conversion products are deposited on the catalyst and must be periodically removed therefrom to restore its activity.

In such reactions conversion of the hydrocarbons is usually endothermic, in varying degrees, and reactivation of the catalyst, which is exothermic, is accomplished by burning the deposited carbonaceous materials therefrom in a stream of oxygen-containing gas.

The range of temperature conditions which may be employed with best results for any specific catalyst and charging stock is relatively narrow and, during reactivation of the catalyst, care must be exercised to prevent the development of temperatures which cause destruction or permanent impairment to the activity of the catalyst. For these reasons, it has heretofore been common practice to control temperatures during both processing of the hydrocarbon reactants and reactivation of the catalyst by circulating a convective medium in indirect heat transfer relation with the catalyst, reactants and reactivating gases. With the relatively short alternate periods of processing and reactivation in each reactor, which are ordinarily required for good results, this method of temperature control is one of the major items of expense both in the initial installation and in operation.

This invention provides a different mode of operation and an apparatus for conducting the same in which the aforementioned conventional method of temperature control and its attendant expense is obviated in a simple and advantageous manner.

To accomplish the improved method of operation, the catalytic material employed to promote the conversion reaction is divided into a plurality of relatively shallow beds in each reactor of the system and provision is made for dividing the stream of hydrocarbon reactants, which is supplied to the reactor in heated state, into a plurality of substantially equal smaller streams, each of which is passed through only one of the several catalyst beds, resulting fluid conversion products being thence removed from the reactor. During reactivation of the catalyst a stream of oxygen-containing reactivating gases, which is supplied to the reactor in heated state, is likewise divided into a plurality of substantially equal smaller streams, each of which is passed through only one of the several catalyst beds, the resulting spent or partially spent reactivating gases and combustion products being thence removed from the reactor.

With this method of operation desirable conditions, approaching those obtainable in a conventional operation in which a convective medium is employed to heat the catalyst bed and reactants during processing and cool the catalyst bed and reactivating gases during reactivation, are obtained without the use of such external temperature control.

As compared with an operation in which other conditions (such as the total volume of catalyst employed, the temperature and rate at which the heated reactants are supplied to the reactor and the type of catalyst and charging stock employed) are the same but wherein the total reactants and reactivating gases are passed through the entire mass of catalyst and no external heating or cooling means are employed, the improved method of operation herein provided results in more uniform temperatures throughout the catalyst mass during processing and reactivation, a higher minimum and higher average temperature in the catalyst mass during processing, a lower maximum and lower average temperature in the catalyst mass during reactivation, as well as lower mass velocities and hence lower pressure drop through the reactor. Due to more uniform temperatures throughout the catalyst mass during processing, the deleterious heavy conversion products deposited on the catalyst mass are more uniformly distributed throughout the latter and the rate of decreasing catalyst activity is much lower. The more uniform deposition of deleterious carbonaceous material is also advantageous during reactivation since it materially assists in preventing the development of excessive temperatures at any point in the catalyst mass.

Depending upon the type of catalyst and charging stock employed, the ratio of catalyst volume to reactants processed in a given time and the general level of temperature and pressure conditions utilized in conducting the process, the length of time desirable for continuous use of the catalyst in promoting the cracking reaction may, due to other considerations, such as optimum quality and yield of gasoline produced, by somewhat less or somewhat more than the length of processing time required to decrease the activity of the catalyst to a point where its reactivation is necessitated, and the length of each processing period will correspond to whichever of the aforementioned times is the shorter. By properly controlling the relative proportions of oxygen and inert ingredients in the reactivating gas stream and properly regulating the rate at which the reactivating gases are supplied to the reactor, the length of the reactivating period may be controlled to approximately correspond to the length of the processing periods.

In the accompanying diagrammatic drawings Fig. 1 is an elevation, shown partially in section, of a specific form of reactor embodying the features of the invention and in which the improved process steps provided by the invention may be conducted.

Figure 1:
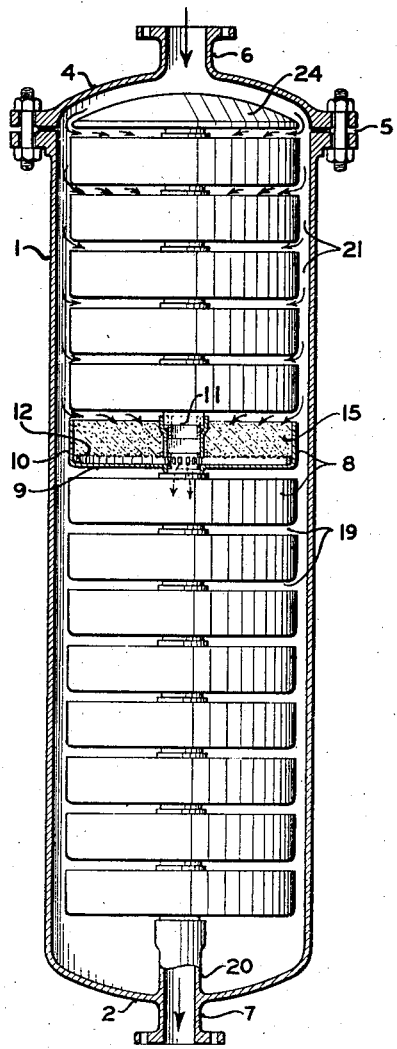
Figure 2:
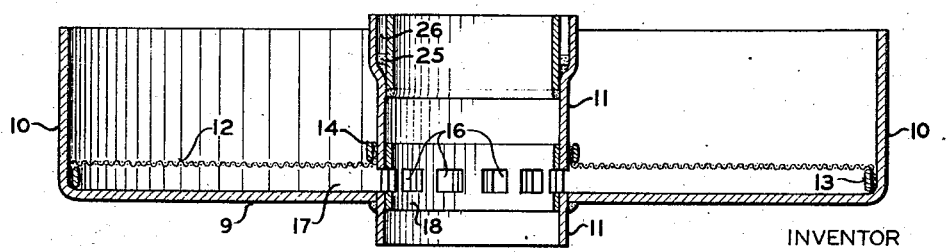
Fig. 2 is an enlarged cross-sectional detail of one of the catalyst trays 8 of Fig. 1.

Referring to Figs. 1 and 2, an elongated cylindrical shell of the reactor, indicated by the reference numeral 1, is provided with a lower head 2 and a removable upper head 4 which is flanged and bolted, as indicated at 5, to shell 1. Inlet nozzle 6 is provided in the removable upper head 4 and outlet nozzle 7 is provided in the lower head 2.

A plurality of catalyst trays 8 are provided within shell 1 between its upper and lower heads and, as illustrated in Fig. 2, each of these members comprises a relatively flat deck 9 having upturned edge portions 10 at its outer circumference and a central tubular member 11 extending from above the level of the upturned edges 10 to beneath the level of deck 9.

A pervious member 12 diagrammatically shown in Fig. 2 as a screen, although a perforate plate or the like may be substituted, is provided between the upturned edges 10 and deck 9 and extends from the upturned edges 10 to the central tubular member 11. Screen 12 is attached, in the particular case here illustrated, to the upturned edges 10 of the tray by turning the outer edge of the screen downward and holding it between the tray and a ring-shaped member 13 which is welded or otherwise secured to the tray. A similar attachment comprising ring-shaped member 14 anchors the inner edge of the screen to member 11.

A relatively shallow bed of catalytic material, indicated at 15 in Fig. 1 is provided in each of the trays 8 above the member 12.

Openings 16 in that portion of member 11 disposed between screen 12 and deck 9 establish communication between the interior of the tubular member 11 and the space 17 provided between the screen and the deck. In the case here illustrated, in order that each of the trays 8 may be identical, a ring-shaped member 18, having openings therethrough corresponding to openings 16, is provided on the interior of tube 11 and by partially rotating member 18 or moving it up or down, the effective area of the openings may be adjusted to suit requirements.

As illustrated in Fig. 1, the lower portion of member 11 of each of the trays nests within the upper portion of member 11 of the next lower tray in such a manner that the trays are spaced a short distance apart, to provide spaces 19 therebetween, and the members 11 form a continuous central conduit through the reactor from the uppermost tray to and through outlet 7. Outlet nozzle 7 includes a portion 20 extending upwardly into the reactor and having an upper end similar to the upper end of members 11 of the trays 18, so that the lower ends of member 11 of the lowermost tray nests within the upper end of member 20.

Each of the trays 8 is sufficiently smaller than the internal diameter of shell 1 that a space 21 is provided therebetween.

A baffle 24 is provided above the uppermost tray 8 within the reactor, this baffle serving to direct the incoming reactants or reactivating gases, as the case may be from inlet 6 to the space 21 between the outer edge of the trays and the inner surface of shell 1.

In operation, the stream of heated reactants to be converted or the stream of hot oxygen-containing gases employed to reactivate the catalyst, as the case may be, enter the upper end of the reactor through nozzle 6 and flood the spaces 21 and 19, from which they flow as a plurality of separate streams of substantially equal volume through the catalyst beds 15 into the space 17 of each of the trays and thence through the openings 16 into the tubular conduit formed by members 11. Thus, each of the separate streams of hydrocarbon vapors and reactivating gases pass through only one of the catalyst beds and then commingle in the central conduit with the streams from the other catalyst beds, the recommingled streams being discharged from the reactor through outlet nozzle 7.

Suitable packing material 25 may be provided within the lower portion of the groove 26 at the upper end of each of the members 11, into which groove the lower end of member 11 of the next higher tray fits, the packing serving to prevent leakage from spaces 19 into the conduit formed by members 11 so as to prevent short circuiting of the catalyst beds by the reactants and reactivating gases.

The ring-shaped members 18 in members 11 are preferably so adjusted that the effective area through openings 16 is progressively greater from the uppermost to the lowermost tray so as to obtain a substantially equal volume of flow through each of the catalyst beds.

The construction illustrated in Figs. 1 and 2 permits ready removal and replacement of the trays after the upper head 4 of the reactor is removed therefrom. It automatically spaces and aligns the trays and permits free longitudinal expansion and contraction of the tray assembly, the latter being supported only from the lower end of the reactor.

Many modifications of the specific form of apparatus illustrated in Figs. 1 and 2 may be provided without departing from the broader aspects of the invention. One such modification is illustrated in Fig. 3 which will now be described.

Figure 3:
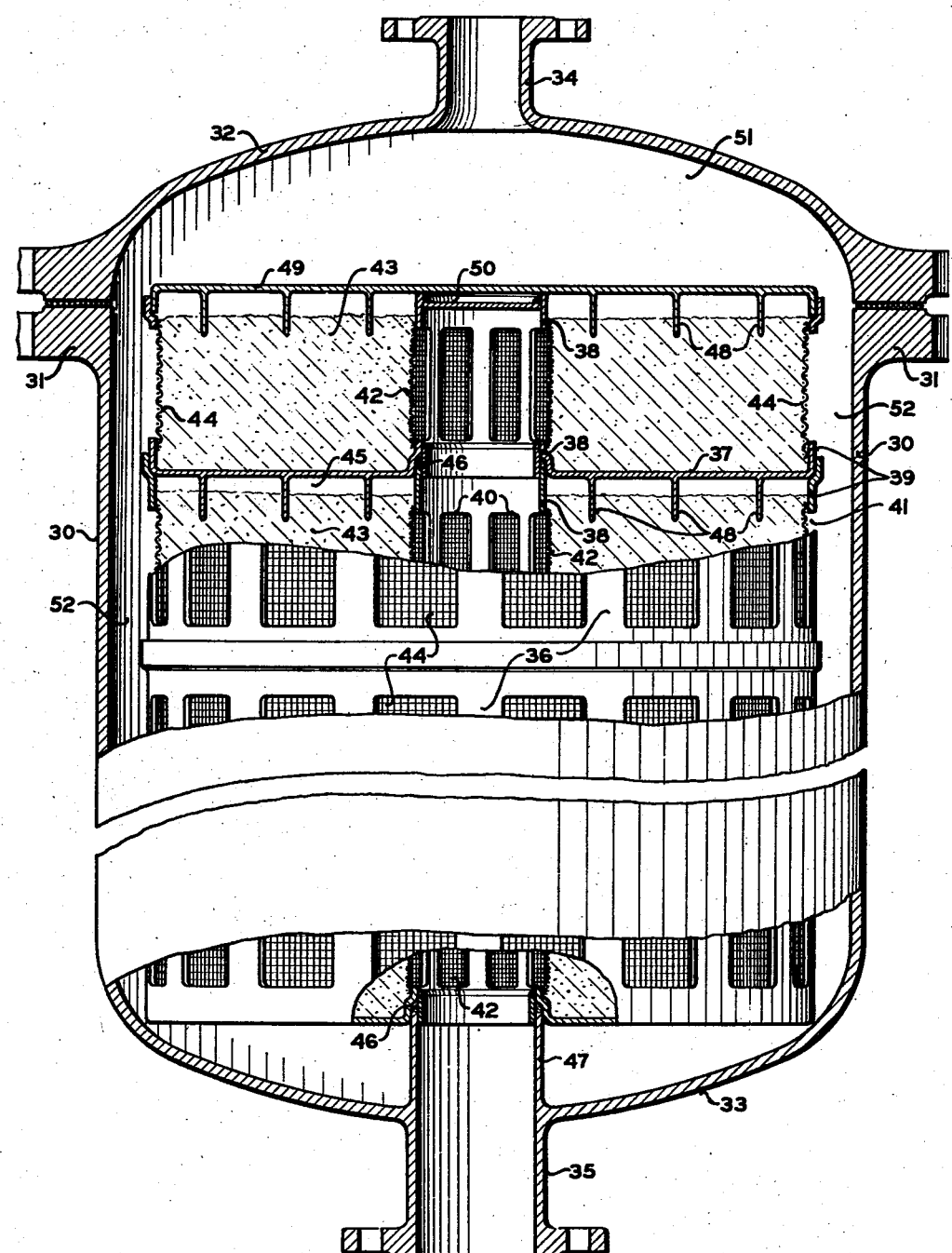
Fig. 3 is an elevation, shown partially in section, of the upper and lower portions of a modified form of reactor embodying the features of the invention.

In Fig. 3 the outer cylindrical shell of the reactor is indicated at 30 and is provided with a flange 31 at its upper end to which the flanged removable upper head 32 is bolted. The lower head 33 is, in this case, as in Fig. 1, integral with the shell. The upper head 32 is provided with an inlet nozzle 34 and the lower head 33 is provided with an outlet nozzle 35.

The catalyst trays 36 of Fig. 3 each comprise a relatively flat bottom portion 37 and upwardly extending inner and outer edges 38 and 39, respectively, which are provided with the respective openings 40 and 41. The openings in the inner member 38 are backed by a continuous pervious member such as screen 42, which is of such mesh as to retain the catalyst particles of bed 43 in place, and a similar continuous pervious member 44 is provided over the openings 41 at the outer edge of the tray.

Each tray of the group rests upon the next succeeding lower tray, the bottom portion 37 of each tray serving as a cover for the next lower tray, and preferably, as here illustrated, a plurality of ring-shaped baffles 48 depend from the bottom portion 37 of each tray and extend partway into the catalyst bed 43 of the next lower tray to prevent short circuiting of the vapors and gases across any space 45 which is left beneath the bottom of each tray and the top of the catalyst bed in the next lower tray.

A vapor tight joint is not required where the outer portions 39 of the trays meet but, preferably, the lower end of each of the inner edge portions 38 of the trays is constructed to receive suitable packing material 46, against which the upper edge of member 38 of the next lower tray bears to maintain a substantially gas-tight joint therebetween.

An extension 47 of outlet nozzle 35 protrudes upward into the shell of the reactor and terminates in an upper end which is received within the packing recess of the lowermost tray to maintain a tight joint at the point of juncture of this tray with the outlet nozzle.

The uppermost tray is provided with a cover 49 provided with baffles 48 and preferably the upper end of the tubular member formed by the walls 38 of the uppermost tray is closed by welding in a disc-shaped member 50 at this point.

With the trays in place in the reactor, their circular inner walls 38 form a continuous central conduit extending from the uppermost through the lowermost tray to portion 47 of outlet nozzle 35, the interior of this conduit being in communication through ports 40 with the catalyst bed on each tray. The trays are sufficiently smaller in external diameter than the internal diameter of shell 30 to provide a substantial space 52 therebetween and a space 51 within the removable upper head 32 of the reactor communicates with space 50 and with the opening through inlet nozzle 34.

Heated hydrocarbon vapors to be converted or hot reactivating gases, as the case may be, pass through nozzle 34 into space 51 and thence into space 52 which extends substantially the full length of shell 30. Their only means of egress from the reactor is through the openings 44, the catalyst beds 43 and the openings 40 into the central conduit from which they pass through outlet nozzle 35. A member similar to member 18 of Fig. 2 may, when desired, be provided opposite the openings 40 in each tray of Fig. 3 to permit variation of the effective area of these openings from top to bottom of the reactor so that a substantially equal volume of hydrocarbon vapors or reactivating gases will pass through the catalyst bed on each tray, or the openings 40 may be made progressively larger from the uppermost to the lowermost tray to accomplish the same result.

Figure 4:
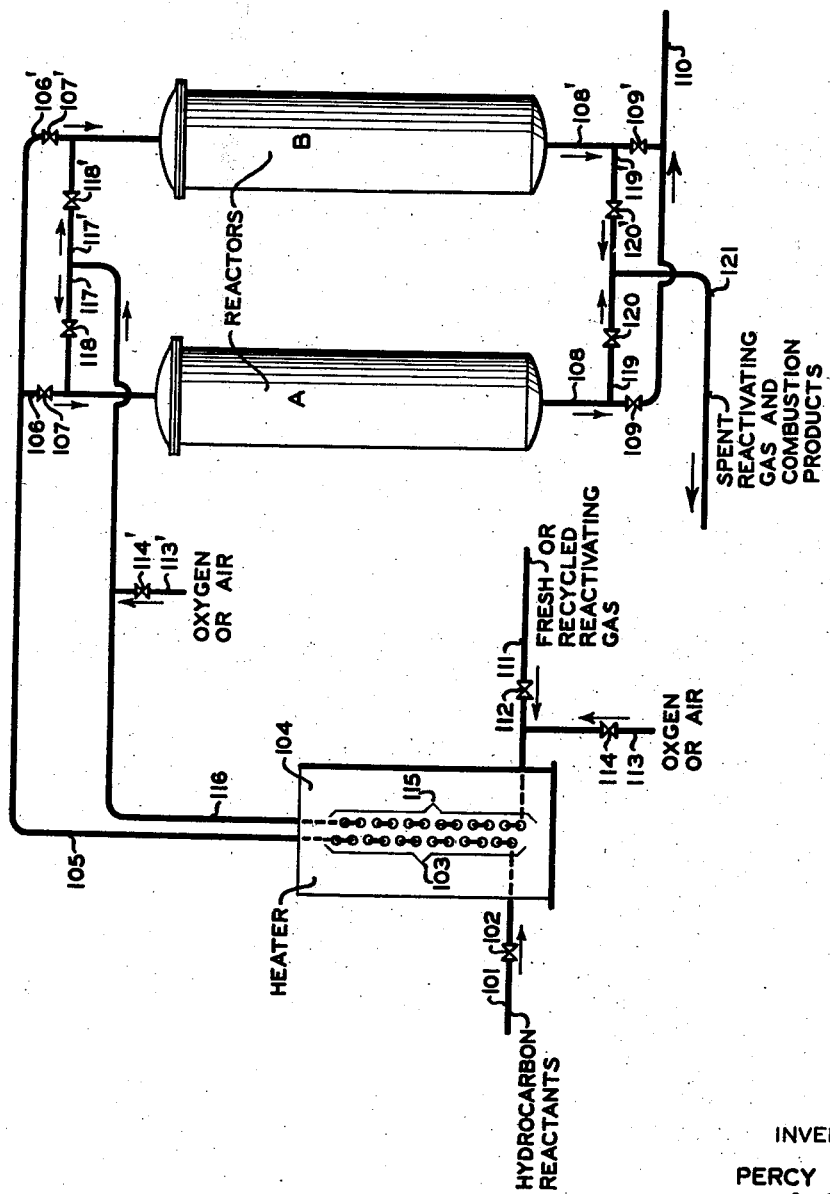
Fig. 4 is a diagram of a process flow wherein two reactors of the improved type provided by the invention are arranged for alternate processing of the hydrocarbons to be converted and reactivation of the catalyst in each reactor.

Referring to Fig. 4, the hydrocarbon to be converted, which may comprise, for example, a stream of hydrocarbon oil to be catalytically cracked, is supplied through line 101 and valve 102 to heating coil 103 disposed in heater 104 wherein the oil is substantially completely vaporized and heated to approximately the temperature at which it is desired to conduct the catalytic cracking reaction.

The resulting heated hydrocarbon vapors are directed from coil 103 through line 105 and, while the cracking reaction is taking place in reactor A, they are supplied thereto from line 105 through line 106 and valve 107. While the cracking reaction is taking place in reactor B, the stream of heated hydrocarbons from coil 103 is directed thereto from line 105 through line 106' and valve 107'.

Reactors A and B are of the improved form provided by the invention wherein the catalyst mass in each reactor is divided into a plurality of relatively shallow beds through each of which a substantially equal portion of the stream of heated hydrocarbons supplied to the reactor is passed. Resulting conversion products from each of said relatively shallow beds are discharged from reactor A, while this reactor is employed for conducting the catalytic cracking reaction, through line 108, valve 109 and line 110 to suitable separating and recovery equipment of any conventional form, which is not a novel part of the invention and is therefore not illustrated. While reactor B is employed for conducting the catalytic cracking reaction, the conversion products from each of the catalyst beds are discharged from this zone through line 108', valve 109' and line 110 to the separating and recovery equipment.

During normal operation of the process, while catalytic cracking is taking place in one of the reactors reactivation of the catalyst is taking place in the other. To accomplish this, a stream of relatively inert gas, such as nitrogen, combustion gases substantially devoid of free oxygen, or the like, are directed from any suitable source through line 111 and valve 112 and combine in this line with regulated amounts of oxygen or air supplied through line 113 and valve 114. The commingled gases from line 111 are directed to heating coil 115 disposed in heater 104 wherein they are heated to a temperature at which the oxygen will react with the heavy carbonaceous conversion products deposited on the catalyst upon contact therewith in the reactor wherein reactivation is taking place. The heated oxygen-containing gases are directed from heater 115 through line 116 and, while reactivation of the catalyst is taking place in reactor A, they are directed from line 116 through line 117, valve 118 and line 106 into this zone. While reactivation of the catalyst is taking place in reactor B, the heated oxygen-containing gases from line 116 are supplied thereto through line 117', valve 118' and line 106'.

The oxygen-containing reactivating gases pass through the reactors in the same manner as the heated hydrocarbon vapors, separate portions of the reactivating gas stream passing through the separate relatively shallow beds of catalytic material in the reactors and burning therefrom the deposited heavy carbonaceous material. The resulting spent or partially spent reactivating gases and combustion products are discharged from reactor A, while reactivation is taking place therein, through line 108, line 119 and valve 120 to line 121. While reactivation is taking place in reactor B, the spent or partially spent reactivating gases and combustion products are directed therefrom through line 108', line 119' and valve 120' to line 121. The gases supplied to line 121 may be discharged from the system, preferably after heat is recovered therefrom for any desired useful purpose, or they may be, in part, recycled to heating coil 115 in any well known manner, not illustrated in the drawings. Preferably, when the spent or partially spent reactivating gases are recycled for further use, deleterious materials such as sulfur compounds, ash and the like are first removed therefrom by any conventional means and their oxygen content and temperature is readjusted to the desired value before they are again introduced into the reactor in which reactivation of the catalyst is taking place. Such provisions are now common practice in the art and their illustration is not considered necessary.

When desired, instead of supplying air or oxygen to coil 115 with the inert components of the reactivating gas stream, the air or oxygen may be added to the heated inert ingredients as they pass through line 116 by supplying the same thereto through line 113' and valve 114'. This will help to avoid oxidation in the heating coil.

It will be understood, of course, that Fig. 4 is only a diagrammatic illustration and that many modifications of the simple apparatus illustrated may be employed without departing from the scope of the invention. Heater 104, for example, is preferably one of the several well known conventional forms in which independent control of the temperature of the streams discharged from coils 103 and 115 is obtained or, when desired, separate heaters may be employed for heating the reactants and the reactivating gases. The invention also contemplates the use of more than two reactors, in which case two or more reactors may be connected for either parallel or series flow of the reactants and reactivating gases therethrough. Special stream diverting or switching valves which handle more than a single stream may also be employed within the scope of the invention to replace the switching valves here illustrated in a conventional manner.

The invention also definitely contemplates purging the reactor in which catalytic cracking has been taking place of hydrocarbon vapors and gases prior to each reactivating period and purging the reactor in which reactivation has been taking place of oxygen-containing gases prior to each cracking period. This is accomplished by discontinuing the supply of oxygen to the system for a short period immediately preceding and immediately following each alternation of the reactors to allow the relatively inert gases to sweep the hydrocarbon vapors and gases from the reactor in which reactivation is about to be initiated and to sweep the oxygen-containing gases from the reactor in which cracking is about to be initiated.

When starting the operation, the reactors are preferably preheated and otherwise preconditioned by circulating hot relatively inert gases from coil 115 therethrough. For example, if reactor A is to be first used for conducting the catalytic cracking operation, inert gases supplied to coil 115 through line 111 and valve 112, and heated therein to a temperature somewhat above that at which it is desired to conduct the cracking reaction, are supplied through line 116, line 117, valve 118 and line 106 to reactor A and therefrom through line 108, line 119 and valve 120 to line 121 for a sufficient length of time to substantially purge the reactor of air and heat it to the desired temperature. Following such preconditioning of reactor A, the hot inert gases are diverted to reactor B to likewise precondition the same while the heated hydrocarbons from coil 103 are supplied to reactor A and the first cracking step of the operation is conducted in the latter. Following the first cracking step in reactor A and preconditioning of reactor B, the heated hydrocarbons are supplied to reactor B wherein the cracking reaction is continued and the heated inert gases are supplied to reactor A for a sufficient length of time to substantially purge this reactor of hydrocarbon vapors and gases, then air is admitted to the stream of inert gases and reactivation of the catalyst in reactor A is accomplished while the cracking reaction continues in reactor B. Shortly before the cracking step in reactor B is completed, the supply of oxygen to the system is discontinued to purge reactor A of oxygen-containing gases and then the stream of heated hydrocarbons is diverted to this reactor while the stream of hot inert gases is diverted to reactor B to purge it of hydrocarbon vapors and gases, oxygen is then again admitted to the system to reactivate the catalyst in reactor B and from this point on the reactors are periodically alternated with purging in each reactor preceding each cracking step and each reactivating step therein.

As an example of one specific operation of the process provided by the invention, as applied to the catalytic cracking of hydrocarbon oil, the charging stock is a Mid-Continent paraffinic distillate of approximately 29° A. P. I. gravity having an initial boiling point of approximately 330° F. One volume of charging stock is combined with approximately 4.5 volumes of primary reflux condensate from the fractionator of the system. This primary reflux condensate has an initial boiling point of about 490° F. and a 50% boiling point of approximately 640° F. The mixture is substantially vaporized and heated prior to its introduction into the reactor, to which it is supplied at a temperature of about 935° F. The average temperature in the reactor is approximately 912° F. and the combined feed (charging oil and primary reflux condensate) is supplied to the reactor at the rate of approximately 4 cubic feet per hour per cubic foot of space occupied by the catalyst. A superatmospheric pressure of approximately 30 pounds per square inch is employed at the inlet of the reactor and the outlet pressure is approximately 28 pounds per square inch, superatmospheric.

During reactivation, combustion gases containing approximately 2.5% by volume of oxygen are supplied to the reactor at a temperature of approximately 1000° F. and a superatmospheric pressure of approximately 75 pounds per square inch. The average of the peak temperatures encountered during the reactivating steps is approximately 1295° F. and the pressure at the outlet of the reactor during reactivation is approximately 65 pounds per square inch.

In an operation such as above described there may be obtained per barrel of charging oil employed, approximately 64.5% of 400° F. end-point gasoline, after stabilization of the latter to a Reid vapor pressure of approximately 9 pounds per square inch. The octane number of this product, as determined by the motor method, may be approximately 78.5. In addition, approximately 13.5% of secondary reflux condensate having a gravity of approximately 27° A. P. I., and an end-boiling point of approximately 615° F. may be produced. The residual liquid product of the process may amount to approximately 3.5% by volume of the charging stock and have a gravity of approximately 17° A. P. I. and a Saybolt Universal viscosity of approximately 75 seconds at 122° F. The gaseous products of the process (exclusive of combustion gases and air) may contain approximately 22% of hydrogen and more than 11% of readily polymerizable olefins which will yield an additional 5 to 6%, based on the charging oil, of good antiknock polymer gasoline by catalytic polymerization.

I claim as my invention:

1. A process which comprises introducing a stream of reactants to one end of a vertically elongated reactor containing spaced superimposed beds of contact material to flow through the reactor from said end to the opposite end thereof in a generally vertical direction, dividing the reactants within and along the inner periphery of the reactor into a plurality of separate streams of substantially equal volume, passing each of said separate streams through one of said beds from a point adjacent the inner periphery of the reactor to a point adjacent the vertical axis of the reactor and effecting reaction of the reactant streams during such passage through the beds of contact material, removing each of the separate streams from contact with said material after it has passed through only one of said beds and commingling the individual streams of reaction products along the vertical axis of the reactor, and removing the reaction products as a single composite stream from the opposite end of the reactor.

2. The process as defined in claim 1 further characterized in that said reactants comprise hydrocarbons which are subjected to conversion in said beds of contact material.

3. The process as defined in claim 1 further characterized in that said reactants comprise vapors of a hydrocarbon oil and said contact material comprises a cracking catalyst, the vapors being cracked during passage through the beds of contact material.

4. The process as defined in claim 1 further characterized in that the contact material comprises a carbonized hydrocarbon conversion catalyst and the reactants being an oxygen-containing gas whose oxygen content is reacted with the carbonaceous matter on the catalyst during passage of the gas through said beds, whereby to regenerate the catalyst.

PERCY MATHER.